(12) United States Patent
Donnelly

(10) Patent No.: US 8,220,572 B2
(45) Date of Patent: Jul. 17, 2012

(54) MULTI-POWER SOURCE LOCOMOTIVE SELECTION

(75) Inventor: Frank Wegner Donnelly, North Vancouver (CA)

(73) Assignee: Railpower, LLC, Nicholasville, KY (US)

(*) Notice: Subject to any disclaimer, the term of this patent is extended or adjusted under 35 U.S.C. 154(b) by 573 days.

(21) Appl. No.: 12/304,863

(22) PCT Filed: Jun. 15, 2007

(86) PCT No.: PCT/CA2007/001067
§ 371 (c)(1),
(2), (4) Date: Oct. 22, 2009

(87) PCT Pub. No.: WO2007/143850
PCT Pub. Date: Dec. 21, 2007

(65) Prior Publication Data
US 2010/0051368 A1  Mar. 4, 2010

Related U.S. Application Data

(60) Provisional application No. 60/814,595, filed on Jun. 15, 2006, provisional application No. 60/886,465, filed on Jan. 24, 2007.

(51) Int. Cl.
*B60W 10/06* (2006.01)
*B60W 10/08* (2006.01)
*B60W 10/24* (2006.01)

(52) U.S. Cl. .............. 180/65.265; 180/65.285; 903/930; 290/40 C; 318/108; 318/149

(58) Field of Classification Search .............. 180/65.21, 180/65.25, 65.265, 65.28, 65.285; 903/930; 290/1 R, 40 C, 40 R; 318/105, 106, 108, 318/109, 140, 149
See application file for complete search history.

(56) References Cited

U.S. PATENT DOCUMENTS

| 7,304,445 | B2 | 12/2007 | Donnelly |
| 7,349,797 | B2 | 3/2008 | Donnelly et al. |
| 7,518,254 | B2 * | 4/2009 | Donnelly et al. .......... 290/40 C |
| 7,906,862 | B2 * | 3/2011 | Donnelly et al. ................ 290/6 |
| 2006/0091832 | A1 | 5/2006 | Donnelly et al. |

FOREIGN PATENT DOCUMENTS

CA 1283472 4/1991
WO WO 2005/084335 A2 3/2005

* cited by examiner

*Primary Examiner* — John Walters
(74) *Attorney, Agent, or Firm* — King & Schickli, PLLC

(57) ABSTRACT

Various control options are applied for selecting the number of operating power sources for a multi-power source vehicle having a number of prime power sources and, optionally including energy storage systems. This system and method are applicable to large vehicles such as locomotives, mining trucks, tugboats and large cranes. Selectable operating modes are provided for different locomotive speed ranges and work loads. The system and method are based on a common DC bus electrical architecture so that prime power sources need not be synchronized. Multiple-engine locomotives are included in which the engine systems may be electrically connected in parallel or in series or in combinations of parallel and series to a DC bus.

42 Claims, 10 Drawing Sheets

MULTI-POWER SOURCE LOCOMOTIVE SELECTION

CROSS REFERENCE TO RELATED APPLICATION

This application is a National Stage Application of PCT/CA2007/001067, filed 15 Jun. 2007, which claims benefit of U.S. Ser. No. 60/814,595, filed 15 Jun. 2006 and U.S. Ser. No. 60/886,465, filed 24 Jan. 2007 and which applications are incorporated herein by reference. To the extent appropriate, a claim of priority is made to each of the above disclosed applications.

FIELD

The present invention relates generally to means of applying various control options for selecting the number of operating power sources for a vehicle comprising a plurality of power sources and particularly to (1) a locomotive having a plurality of engines and (2) a locomotive having a plurality of engines and energy storage systems. The general method can be applied to a locomotive having a plurality of power sources, fuel types and drive train combinations. These methods pertain to multiple engine configurations where the engines may be connected in parallel to a common DC bus or in series to a common DC bus or in combinations of parallel and series to a common DC bus.

BACKGROUND

Railroads are under increasing pressure to reduce emissions and to increase fuel efficiency. One of several responses to these forces has been the development of hybrid locomotives. Donnelly has disclosed the use of a battery-dominant hybrid locomotive in U.S. Pat. No. 6,308,639 which is incorporated herein by reference. Hybrid locomotives can reduce emissions and fuel consumption in rail operations such as yard switching but they are less effective for medium haul freight or commuter trains.

In U.S. patent application Ser. No. 11/200,881 filed Aug. 19, 2005 entitled "Locomotive Power Train Architecture", Donnelly et al. have further disclosed a general electrical architecture for locomotives based on a plurality of power sources, fuel and drive train combinations. The power sources may be any combination of engines, fuel cells, energy storage and regenerative braking. This application is also incorporated herein by reference.

The development of multi-engine locomotives is another response to the search for more energy efficient and emissions compliant locomotives. In U.S. patent application Ser. No. 11/201,267 filed Aug. 9, 2005 entitled "Multiple Engine Locomotive Configuration", Donnelly et al. have disclosed a means of packaging engine modules on a multi-engine locomotive that optimizes the power density of the locomotive power plants while reducing emissions and fuel consumption. In a U.S. patent application Ser. No. 11/412,071 filed Apr. 25, 2006 entitled "Multiple Prime Power Source Locomotive Control", Donnelly et al. further disclose a general means for controlling and balancing a number of prime power sources powering a locomotive, including control for various operating modes such as for example, (1) a maximum fuel efficiency mode; (2) a minimum emissions mode (whether of a substance or energy, such as noise); (3) a combination mode of good fuel efficiency and low emissions; (4) a maximum power mode; and (5) an optimum engine lifetime mode.

There are a number of practical considerations that need to be considered in implementing control schemes for multi-power source locomotives. For example, if diesel engines are used, strategies must be developed to ensure the engines are not turned on and off too frequently. As another example, maximum tractive effort may be required in low speed yard switching work; maximum fuel economy may be required in short haul medium speed operations; maximum acceleration and maximum fuel economy may be required at different times in commuter operation; and various combinations of maximum fuel economy and minimum emissions may be required in different locations on long haul routes. These various operating modes cannot all be accommodated by a single notch power table prescription for selecting the number of engines, engine speeds and engine power levels. Thus there is a need for a practical method of selecting engine operating modes by the locomotive engineer that allows the performance benefits of a multi-engine locomotive to be realized.

SUMMARY

These and other advantages will be apparent from the disclosure of the invention(s) contained herein.

The various embodiments and configurations of the present invention are directed generally to controlling the individual prime power systems of a multi-prime power source vehicular propulsion system. The inventions disclosed herein are applicable to locomotives utilizing prime power sources such as diesel engines, gas turbine engines, fuel cells, other types of internal combustion engines or combinations of these. The inventions disclosed herein are also applicable to locomotives utilizing multiple prime power sources and energy storage units (hybrid locomotives). Energy storage systems include battery packs, capacitor banks, flywheels and compressed air storage systems, for example. The inventions may also apply to other types of vehicles or systems that require substantial power and low emissions utilizing multiple power plant combinations. Examples of other vehicles and systems include large trucks such as mining trucks, tugboats and large cranes.

The present invention include application to multi-engine locomotive configurations where the engine systems are connected (1) in parallel to a common DC bus; (2) in series with a common DC bus; or in combinations of parallel and series.

Typically a diesel-electric locomotive is operated by selecting a desired power level for the locomotive. In a locomotive power settings are based on a low idle setting; a high idle setting and power notch settings from 1 to 8. As can be appreciated, a locomotive may only have a single idle setting. The same operating mode strategy can be applied to a multiple engine locomotive having between two and about eight separate engines where the engines need not have the same power rating since all engines are assumed to output DC electrical power to a common DC bus (a so-called electric transmission). Thus when an engineer selects a particular power setting, the locomotive's controller apparatus controls the engines and traction motors until the desired power to the traction motors is achieved. The application of various possible operating modes for a multiple engine locomotive is disclosed herein.

In a first operating mode for a multi-engine locomotive, each power setting corresponds to a preselected locomotive power level which is obtained by a set number of engines each set at the same power level and rpm for each notch setting. This simple first operating mode can present difficulties when the engineer goes back and forth in notch settings as might be done for example in yard switching operations. Engines and their associated starter motors will wear out quickly if engines are turned on and off frequently.

In a second operating mode, each power setting approximately corresponds to the preselected locomotive power level which is obtained by a set number of engines as in the first operating mode. However, in the second operating mode, the last engine selected is operated at a different power level and speed than the previously engaged engines. The advantage of this mode is that all but one of the engaged engines can be operated at a speed (rpm) such as for example at an optimum desired rpm.

In a third operating mode, each power setting can correspond to a preselected locomotive power level which is obtained by bringing another engine on-line as soon as the currently operating engines reach a certain percentage of their rated power. This simple third operating mode can also present difficulties when the engineer goes back and forth in notch settings as might be done for example in yard switching operations.

In a fourth operating mode, the locomotive engineer selects the number of engines to be used and that number remains unchanged until the engineer changes it. This is a particularly practical option for moving the locomotive around a switching yard; moving the locomotive to a new location; or doing low speed switching operations (from about 0 to about 5 mph for example) where, for example, one or two engines can provide the required tractive effort.

In a fifth operating mode, each power setting is met by operating a selected number of engines in their most fuel efficient mode. This could be done automatically by a controller programmed to use specific fuel consumption maps for each engine and to optimize the engine's power and rpm settings to obtain the lowest fuel consumption at each power setting.

In a sixth operating mode, each power setting is met by operating a selected number of engines in their lowest emissions mode. This could be done automatically by a controller programmed to use specific emissions output maps for each engine and to optimize the engine's power and rpm settings to obtain the minimum emissions output at each power setting.

In the present invention, the locomotive would include a control panel or computer screen that would allow the locomotive engineer to select from a number of available engine operating modes such as for example the six operating modes described above. The present invention would have available for engineer selection at least two operating modes and preferably three or more operating modes.

As can be appreciated, the engines can be operated at the same power levels and speeds (rpm)s or they can each be operated at different power levels and rpms to achieve a desired operating mode.

The same operating strategies can be applied to a hybrid locomotive which is comprised of several engines and one or more energy storage systems. For example, the locomotive engineer could turn off all prime power sources and operate the locomotive solely on battery power such as done in yard switching operations with a battery dominant hybrid locomotive described in U.S. Pat. No. 6,308,639.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

The following definitions are used herein:

A locomotive is generally a self-propelled railroad prime mover which is powered either by a steam engine, diesel engine or externally such as from an overhead electrical catenary or an electrical third rail.

An engine refers to any device that uses energy to develop mechanical power, such as motion in some other machine. Examples are diesel engines, gas turbine engines, microturbines, Stirling engines and spark ignition engines A prime power source refers to any device that uses energy to develop mechanical or electrical power, such as motion in some other machine. Examples are diesel engines, gas turbine engines, microturbines, Stirling engines, spark ignition engines or fuel cells.

A motor refers to a device that produces or imparts motion.

A traction motor is a motor used primarily for propulsion such as commonly used in a locomotive. Examples are an AC or DC induction motor, a permanent magnet motor and a switched reluctance motor.

An energy storage system refers to any apparatus that acquires, stores and distributes mechanical or electrical energy which is produced from another energy source such as a prime energy source, a regenerative braking system, a third rail and a catenary and any external source of electrical energy. Examples are a battery pack, a bank of capacitors, a compressed air storage system and a bank of flywheels.

An electrical energy converter refers to an apparatus that transmits or blocks the flow of electrical energy and may also increase or reduce voltage and change the frequency of the transmitted energy including changing the frequency to zero. Examples but are not limited to an inverter, a rectifier circuit, a chopper circuit, a controlled rectifier such as a cycle converter, a boost circuit, a buck circuit and a buck/boost circuit.

A mechanical-to-electrical energy conversion device refers an apparatus that converts mechanical energy to electrical energy. Examples include but are not limited to a synchronous alternator such as a wound rotor alternator or a permanent magnet machine, an asynchronous alternator such as an induction alternator, a DC generator, and a switched reluctance generator.

An engine system as used herein refers to the engine and its mechanical-to-electrical energy conversion device so the output power of an engine system is electrical.

Dynamic braking is implemented when the electric propulsion motors are switched to generator mode during braking to augment the braking force. The electrical energy generated is typically dissipated in a resistance grid system.

Regenerative braking is the same as dynamic braking except the electrical energy generated is recaptured and stored in an energy storage system for future use.

Engine speed is the rotary speed of the engine output drive shaft and is typically expressed in rpms.

Alternator speed is the rotary speed of the alternator rotor and is typically expressed in rpms. The alternator speed is commonly the same as engine speed since they are usually directly connected with no intermediate gearing.

An IGBT is Insulated Gate Bipolar Transistor which is a power switching device capable of sequentially chopping a voltage waveform at a very fast rate.

The duty cycle of an IGBT is the ratio of time that the IGBT is switched on (conducting) to the total time that the IGBT is switched on (conducting) and off (non-conducting).

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

LIST OF TABLES

Table 1 is for single engine.
Table 2 is for a multi-engine locomotive with fixed engine selection for each notch setting.
Table 3 is for a multi-engine locomotive with a single variable engine allowed to vary.
Table 4 is for a multi-engine locomotive with engine selection determined by load.
Table 5 is for a multi-engine locomotive with a fixed number of engines selected by the engineer.
Table 6 is for a multi-engine locomotive with engines selected for maximum fuel economy.
Table 7 is for a multi-engine locomotive with engines selected for minimum emissions.
Table 8 is for a multi-engine hybrid locomotive.

DETAILED DESCRIPTION

Engine Operating Modes

Figure 1:
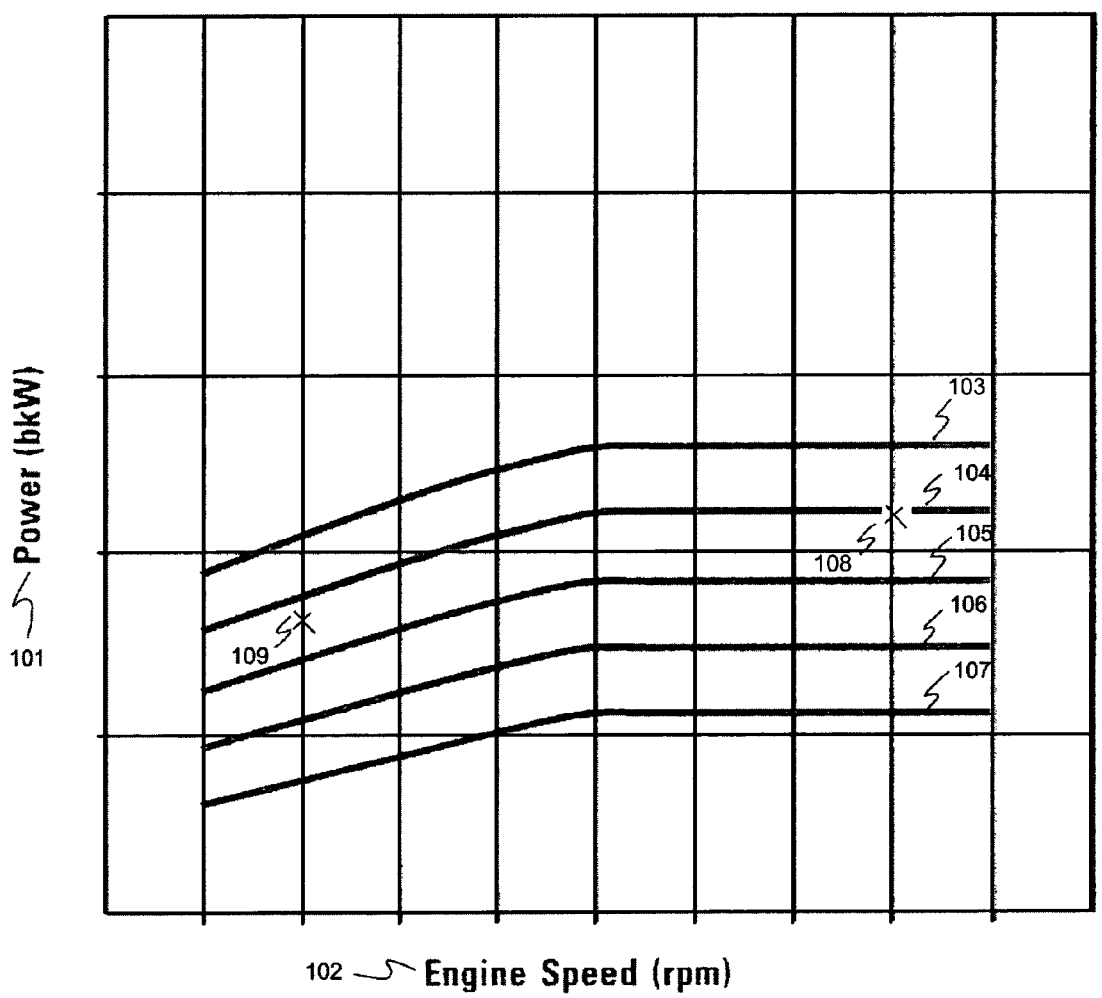
FIG. 1 is an plot of engine power versus engine speed.
Figure 2:
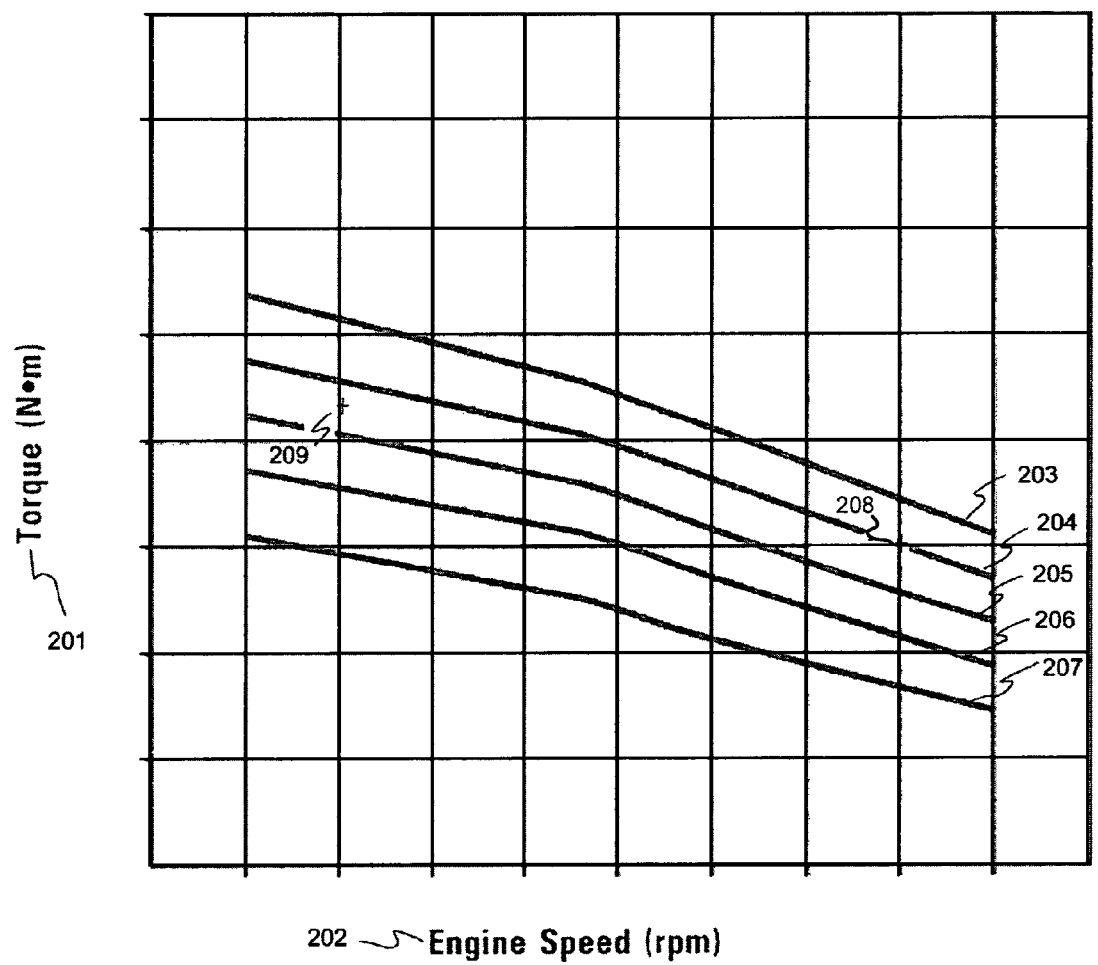
FIG. 2 is an plot of engine torque versus engine speed.

The following examples of control modes are illustrated by a hypothetical locomotive having six identical engines, each engine having a power versus rpm and a torque versus rpm curves qualitatively such as a shown in FIGS. 1 and 2. Where references are made to setting the engine power and/or engine speed for a particular power setting, it will be understood that such setting can be established for the output voltage or output current where the engine drives a generator, or the power source is a battery pack, capacitor bank, fuel cell system or the like.

A typical engine output power 101 versus engine speed 102 plot is shown in FIG. 1. Curves 103, 104, 105, 106 and 107 represent typical maximum engine power output versus engine speed for recommended uses as often specified by the engine manufacturer. Examples of types of uses are:

service 103 where maximum power is required for periodic overloads;
high intermittent service 104 and low intermittent service 105 where maximum power and/or speed are cyclic;
continuous service 106 where power and speed are cyclic
continuous heavy duty service 107 where the engine is operated at maximum power and speed without interruption or load cycling Locomotives typically operate in service where power and speed are continuous but cyclic and where the locomotive periodically requires operation at maximum overload power. A high speed operating point 108 where the output voltage of the alternator/rectifier requires no boost is shown along with a low speed operating point 109 where the output voltage of the alternator/rectifier requires a boost to continue to provide power to a DC bus.

A typical engine output torque 201 versus engine speed 202 plot is shown in FIG. 2. Curves 203, 204, 205, 206 and 207 represent the torque at the corresponding power and speeds shown by curves 103, 104, 105, 106 and 107 of FIG. 1. Torque is proportional to power divided by rotary speed and therefore decreases with increasing engine speed when output power is approximately constant. A high speed operating point 208 is shown along with a low speed operating point 209, corresponding to the operating points 108 and 109 respectively of FIG. 1.

For a locomotive utilizing multiple diesel engines, the following are examples of how diesel engines may be operated in various modes. As can be appreciated, similar operating modes may be used for other types of engines.

Examples of operating modes include:
maximum fuel efficiency mode
minimum emissions mode (whether of a substance or energy, such as noise)
a combination mode of good fuel efficiency and low emissions
maximum power mode
an optimum engine lifetime mode As can be appreciated, engines may be selected to operate in different modes at the same time. For example, some engines may be operated in a fuel efficient mode while others are operated in a low emissions mode such that, for example, the locomotive as a whole is operated at a desired overall fuel efficiency and emissions performance level.

Figure 3:
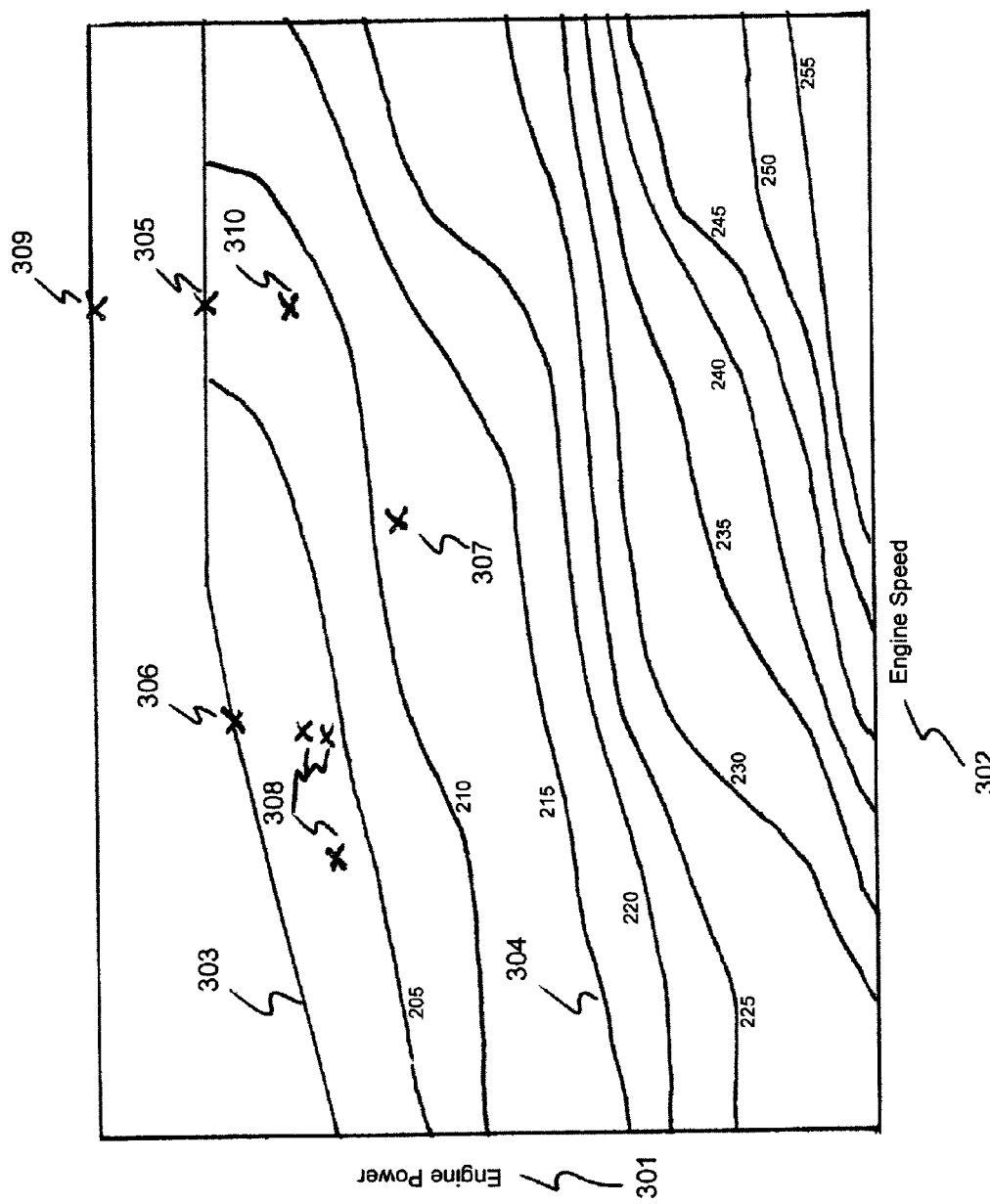
FIG. 3 is an example of a fuel map for a diesel engine.
Figure 4:
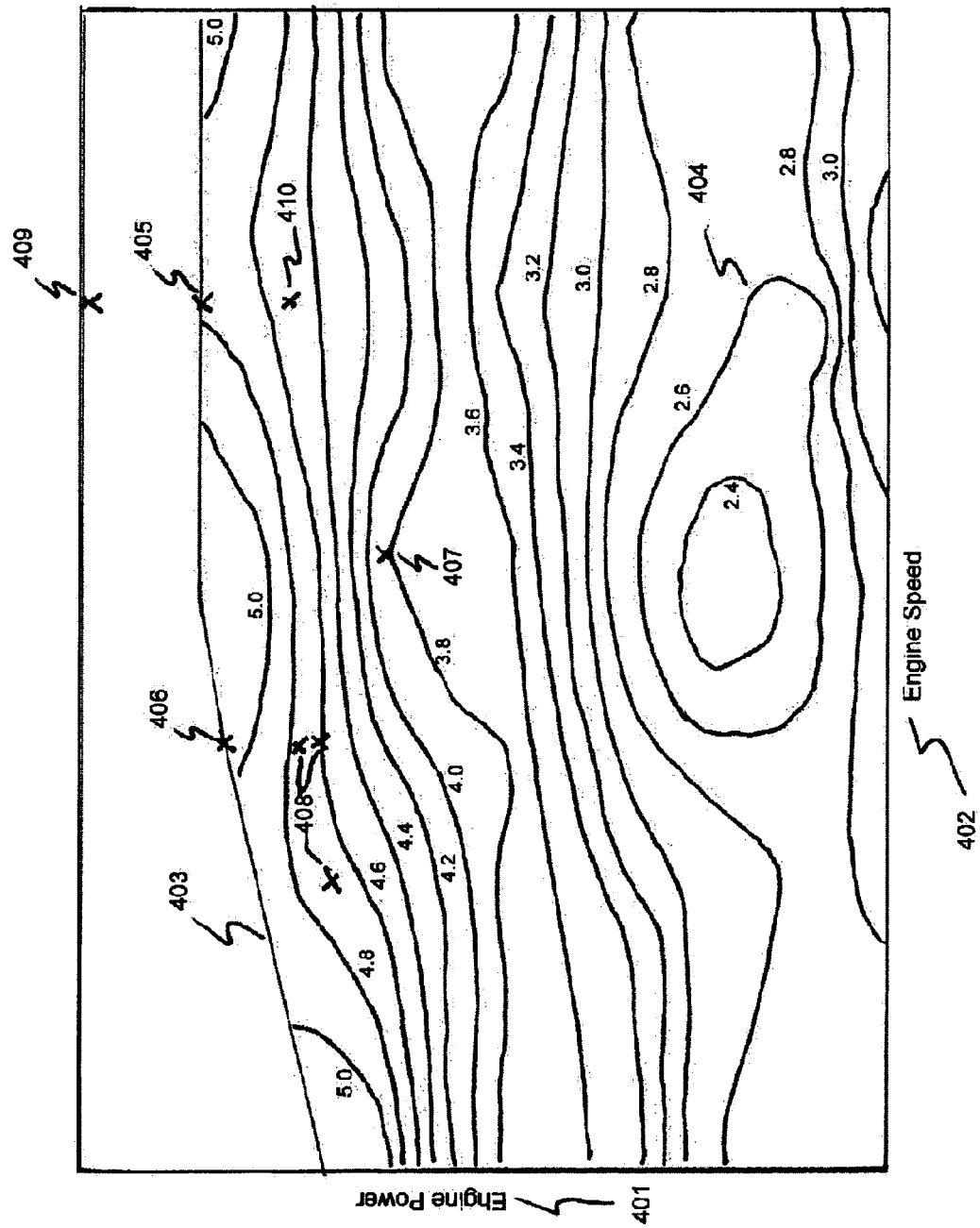
FIG. 4 is an example of an emissions map for a diesel engine.

These engines also have specific fuel consumption and emissions level maps such as shown in FIGS. 3 and 4.

A typical diesel engine fuel map is shown in FIG. 3. In this example, engine output power 301 is plotted versus engine speed 302. The power is typically in kW and the speed is typically in revolutions per minute ("rpms"). In some fuel maps, engine output torque may be plotted versus engine speed but in the present invention it is preferable to plot power versus speed. The maximum recommended power for a specific type of use (described previously in FIG. 1) available at any engine speed is shown by the power limit curve 303. Contours 304 of constant specific fuel consumption are also shown. The contours 304 are typically expressed as grams of fuel consumed per kW-hr of output energy or liters of fuel consumed per kW-hr of output energy. In the example contours shown in FIG. 3, the specific fuel consumption values of each contour are shown expressed grams of fuel consumed per kW-hr. In FIG. 3, a nominal predetermined operating point 305 is shown. A maximum fuel efficiency operating point 306 is shown where the output power and engine speed are lower than the nominal operating point. A minimum NOx emissions operating point 307 (described further in FIG. 4) is shown where the output power and engine speed are also lower than the nominal operating point and at a significantly lower power than the maximum fuel efficiency operating point 306. Operating points 308 all represent combinations of both lower specific fuel consumption and NOx emissions as compared to the nominal operating point 305. Operating point 309 is an example of increased output power at the same engine speed as the nominal operating point 305. This operating point may be selected for, for example, by the requirement for a short burst of maximum power for rapid acceleration. Typically, the control system on an engine can allow an engine to run at a higher power rating for a limited time, then will automatically derate the engine to a lower power curve after the specified time period has elapsed. Finally, operating point 310 is an example of reduced output power at the same engine speed as the nominal operating point 305 which may be selected for increasing engine lifetime. A combination of slightly increased engine speed and/or reduced operating power (as compared to the nominal operating point 305) may also be used to increase engine lifetime due to reduced internal pressures and stresses in the combustion cycle of the engine. The above illustrates an example of the use of a fuel map for determining a selected engine operating mode.

A typical NOx emissions map is shown in FIG. 4. In this example, which corresponds to the fuel map of FIG. 3, engine output power 401 is plotted versus engine speed 402. The power is typically in kW and the speed is typically in revolutions per minute ("rpms"). In some emissions maps, engine output torque may be plotted versus engine speed but in the present invention it is preferable to plot power versus speed. The maximum recommended power for a specific type of use (described previously in FIG. 1) at any engine speed is shown by the power limit curve 403 and corresponds to limit curve 103 in FIG. 1. Contours 404 of constant specific NOx emissions are also shown. The contours 404 are typically expressed as grams of NOx emitted per kW-hr of output energy. In the example contours shown in FIG. 4, the specific NOx emission values of each contour are shown expressed grams of NOx emitted per kW-hr. In FIG. 4, a nominal predetermined operating point 405 is shown which corresponds to the nominal operating point 305 of FIG. 3. A maximum fuel efficiency operating point 406, a minimum NOx emissions operating point 407, a maximum power operating point 409 and a optimum engine lifetime operating point 410 are also shown and correspond to the maximum fuel efficiency, minimum NOx emissions, maximum power and optimum engine lifetime operating points of FIG. 3. Similarly, operating points 408 represent combinations of both lower specific fuel consumption and NOx emissions compared to the nominal operating point 405.

As can be seen, both fuel and emissions maps are used to select a desired operating mode, since, in general, fuel consumption improves with decreasing engine speed with little change in NOx emissions levels, while NOx emissions can be reduced with a reduction in power but at the expense of increased fuel consumption. As can be appreciated, operating points may also be selected to minimize particulate and other emissions using similar maps relating to these emissions.

In each of the following examples, the locomotive power settings are based on a low-idle setting; a high-idle setting and power notch settings from 1 to 8. As can be appreciated, a locomotive may only have a single idle setting. The same operating mode strategy can be applied to a multiple engine locomotive having between two and about eight separate engines where the engines need not have the same power rating since all engines are assumed to output DC electrical power to a common DC bus (a so-called electric transmission).

Typically a diesel-electric locomotive is operated by selecting a desired power level for the locomotive. These power settings usually correspond to an idle setting or settings and eight power notch settings. Thus, when an engineer selects a particular power setting, the locomotive's controller apparatus controls the engines and traction motors until the desired power to the traction motors is achieved.

Table 1 illustrates the output brake horsepower ("BHP") and corresponding engine speed ("rpm") for a single 630 HP industrial engine such as might be used for a large truck. This engine is typical for an engine having an output horsepower in the range of 600 to 700 BHP and illustrates a possible BHP versus rpm settings for use as one of a number of engines that could be used in a multi-engine locomotive.

Figure 5:
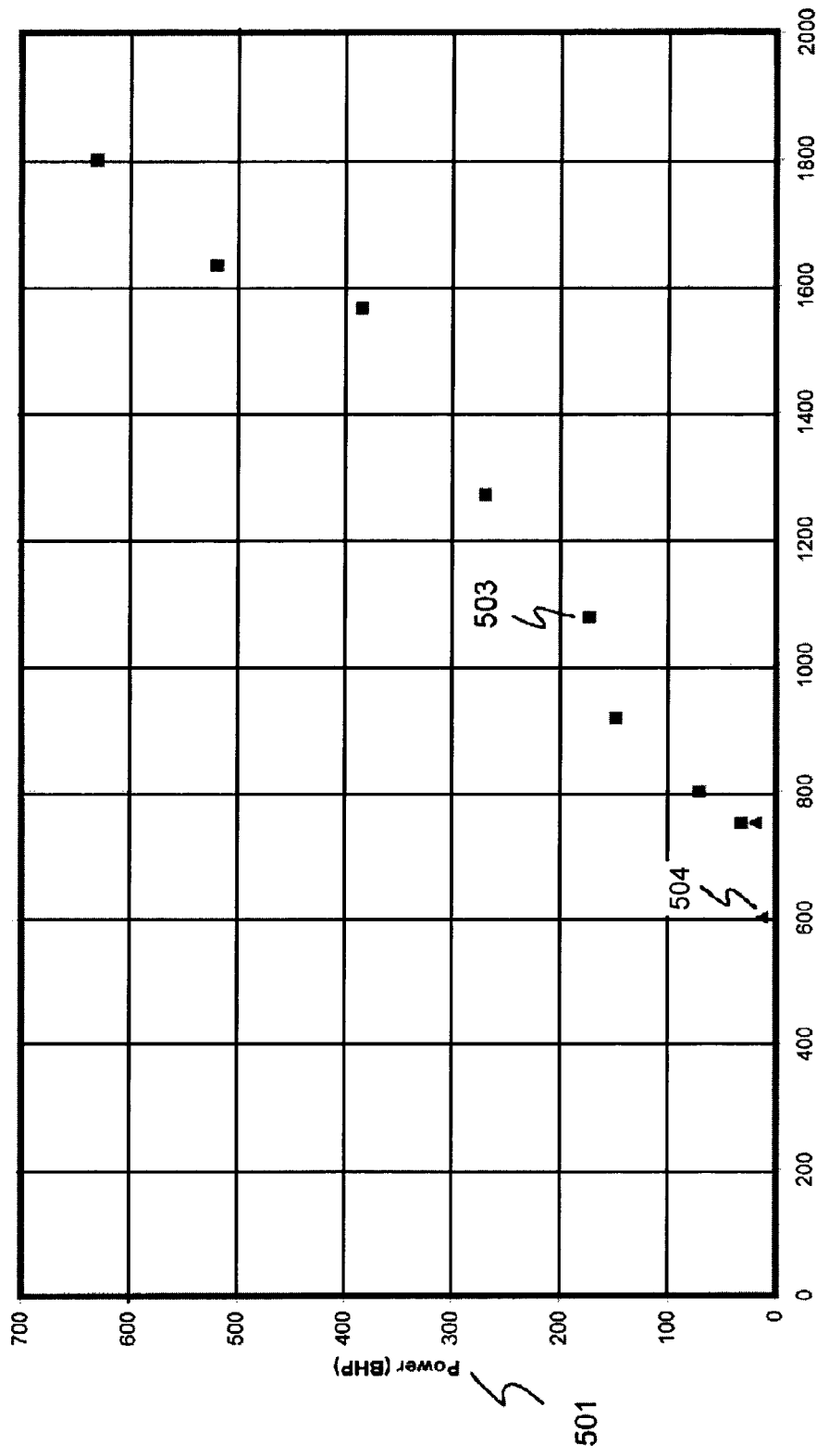
FIG. 5 is a plot of engine power versus engine speed for a single engine at a preferred condition.

FIG. 5 is a plot of engine power 501 versus engine speed 502 for a single engine at a preferred condition. The two idle settings (low-idle and high-idle) are represented by triangles 504. The eight notch settings are represented by squares 503. This might represent a manufacturer's recommended settings for use on a locomotive where the manufacturer has recommended performance that optimizes for example power, fuel economy and engine lifetime.

Multi-Engine Operating Options

The application of various possible operating modes for a multiple engine locomotive based on six engines is illustrated in the following discussion where these examples are based on the typical engine of Table 1. As can be appreciated, the engine of Table 1 can be operated with different combinations of power and speed, depending, for example, on the duty cycle anticipated for the engine, peak power requirements, fuel economy and emissions levels, as was discussed previously in FIGS. 1 through 4.

Figure 6:
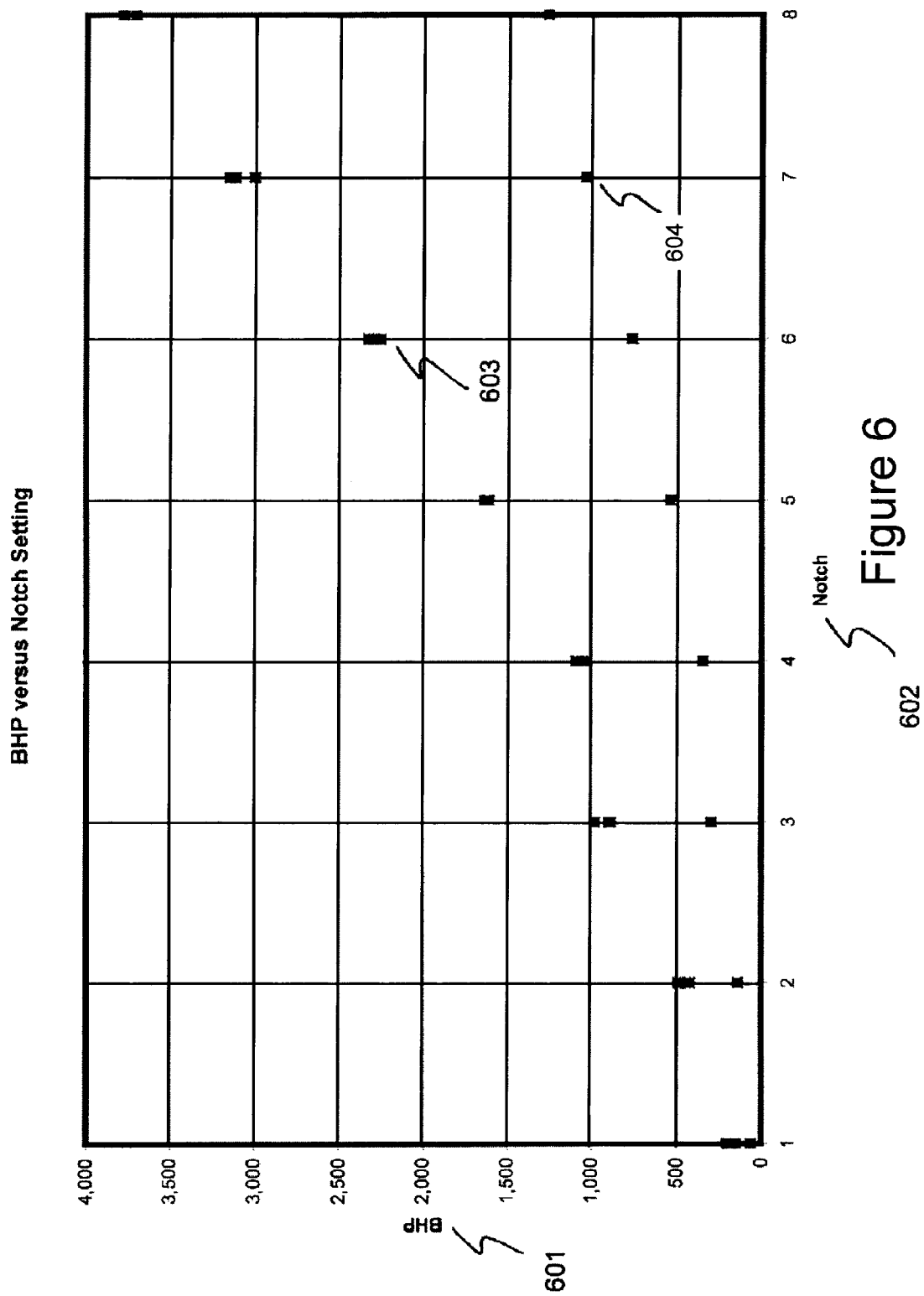
FIG. 6 is a plot of total locomotive engine power versus notch setting for a multi-engine locomotive configuration.

In a first operating mode for a multi-engine locomotive, each power setting corresponds to a preselected locomotive power level which is obtained by a preselected number of engines always set at the same power level and rpm for each notch setting. This is illustrated in Table 2. Table 2 shows that as notch power is increased, the number of engines required varies while the speed of all the selected engines is the same. The plot of power versus notch setting for this preset engine schedule is shown in FIG. 6. FIG. 6 shows a plot of total locomotive output power 601 versus the eight power notch settings 602. When a variable number of engines are activated, the engines may be operated at different power and speed settings to achieve different operating modes but the power developed at each notch setting is approximately the same and is typically specified by the locomotive owner and/or operator. Thus all the total locomotive power outputs 603 are approximately the same for the different engine operating modes. The exception is the operating mode whereby a fixed number of engines is specified and in this case the total locomotive power output is lower for the higher notch settings 604.

This simple first operating mode can present difficulties when the engineer goes back and forth in notch settings as might be done for example in yard switching operations. Engines and their associated starter motors will wear out quickly if engines are turned on and off frequently.

A procedure that would improve the wear and tear on engines that are turned on and off frequently is to include an algorithm in the controller (a PLC or computer for example) that keeps an engine in low- or high-idle for a selected period of time after it has been deselected (as for example when moving from notch 8 to notch 7 in the example of Table 2). A further strategy that can retain a high degree of responsiveness is to always have one unused engine idling at high-idle so that when additional power is requested, the engine at high-idle can be brought on-line quickly. Additionally, one of the engines at low-idle can then automatically be increased to high-idle to put another unused engine at the ready for additional power increases.

In a second operating mode, each power setting approximately corresponds to the preselected locomotive power level which is obtained by a set number of engines as in the first operating mode. However, in the second operating mode, the last engine selected is operated at a different power level and speed than the previously engaged engines. This is illustrated in Table 3. The plot of power versus notch setting for this preset engine schedule is approximately the same as that shown in FIG. 6. The advantage of this mode is that all but one of the engaged engines can be operated at a speed (rpm) such as for example at an optimum desired rpm as shown in Table 3 (1,800 rpms in this example except for the one engine allowed to vary). As can be appreciated, the engine selected to have a variable rpm can be changed from time to time so that no one engine wears differently than the other engines.

In a third operating mode, each power setting can correspond to a preselected locomotive power level which is obtained by bringing another engine on-line as soon as the currently operating engines reach a certain percentage of their rated power. This is illustrated in Table 4. In this example, when the engines that are providing power to the DC bus exceed a certain percentage of their power rating (say about 60% to about 85%), then an additional engine is brought on line. As can be seen by comparing Table 2 and Table 4, the number of engines selected for each notch setting is different for the intermediate notch settings even though the locomotive power versus notch setting is approximately the same for both examples as shown in FIG. 6.

This simple third operating mode can also present difficulties when the engineer goes back and forth in notch settings as might be done for example in yard switching operations. Engines and their associated starter motors will wear out quickly if engines are turned on and off frequently. As discussed in relation to the first operating mode, a procedure that would improve the wear and tear on engines that are turned on and off frequently is to include an algorithm in the controller that keeps an engine in low or high idle for a selected period of time after it has been deselected. A further strategy that can retain a high degree of responsiveness is to always have one unused engine idling at high-idle so that when additional power is requested, the engine at high-idle can be brought on-line quickly. Additionally, one of the engines at low-idle can automatically be increased to high-idle to put another unused engine at the ready for additional power increases.

In a fourth operating mode, the engineer selects the number of engines to be used and that number remains unchanged until the engineer changes it. An example of this mode is illustrated in Table 5. This is a particularly practical option for moving the locomotive around a switching yard; moving the locomotive to a new location; or doing low speed switching operations (from about 0 to about 5 mph for example) where, for example, two engines can provide the required tractive effort. FIG. 6 shows a plot of total locomotive output power 601 versus the eight power notch settings 602 and illustrates this operating mode (a fixed number of engines specified) with the notch power settings 604.

In a fifth operating mode, each power setting is met by operating a selected number of engines in their most fuel efficient mode. This could be done automatically by a controller or computer programmed to use specific fuel consumption maps such as shown in FIG. 3 for each engine and to optimize the engine's power and rpm settings to obtain the lowest fuel consumption at each power setting. An example of this is shown in Table 6.

In a sixth operating mode, each power setting is met by operating a selected number of engines in their lowest emissions mode. This could be done automatically by a controller or computer programmed to use specific emissions output maps such as shown in FIG. 4 for each engine and to optimize the engine's power and rpm settings to obtain the minimum emissions output at each power setting. An example of this is shown in Table 7. This could be done for any number of emissions categories such as hydrocarbons (HC), carbon monoxide (CO), nitrous oxides (NOxs) and particulate material (PM) or a combination of these emissions variables.

Means of assigning engines to maximize engine lifetime can be carried out by a variety of methods. When multiple power sources are used at predefined different power and engine speed settings for a given vehicle power setting, there may be a time based rotation of these settings, such as by a round robin scheduler, so that in the long run all power sources will have experienced the same duties. This would thereby balance the operation hours and energy generated by all power sources. Further, power sources may be selected or deselected based on contingencies. For example, an engine that was not performing well would be selected last or even not at all if the problem was severe enough. In either case, the algorithm that selects the number of engines may consider the operating history of the engines, so as to avoid using some engines more than others and thereby approximately balancing the usage and maintenance period of the engines. An engine log typically contains information on engine usage (hours, fuel consumption, lubricant consumption, total rpms, megawatt-hours, hours in idle modes, hours in the various notch settings and hours in dynamic braking and the like) and maintenance history. Although less preferable than consulting an engine log, the selection algorithm may be engine selection by a random number between one and the number of available engines, which, over time, should even out engine usage. The selection algorithm may be engine selection by rotation to the next engine in an engine sequence which, over time, should also tend to even out engine usage. A selected engine may need to be derated. For example, the selected engine may have one or more cylinders operating at less than optimum rating, the engine's control system may automatically derate the engine to a lower power after a specified time period of operating at a higher-than-normal power rating or any number of other well-known reasons for derating engine performance. If an engine is required to be derated, then the number of engines may be re-selected since the derated engine may require an additional engine to provide the requested power.

In the present invention, the locomotive would include a control panel or computer screen that would allow the locomotive engineer to select from a number of available engine operating modes such as for example the six operating modes described above. The present invention would have available for engineer selection at least two operating modes and preferably three or more operating modes.

As can be appreciated, the engines can be operated at the same power levels and speeds (rpm)s or they can each be operated at different power levels and rpms to achieve a desired operating mode.

Multi-Engine with Energy Storage Configuration

Figure 8:
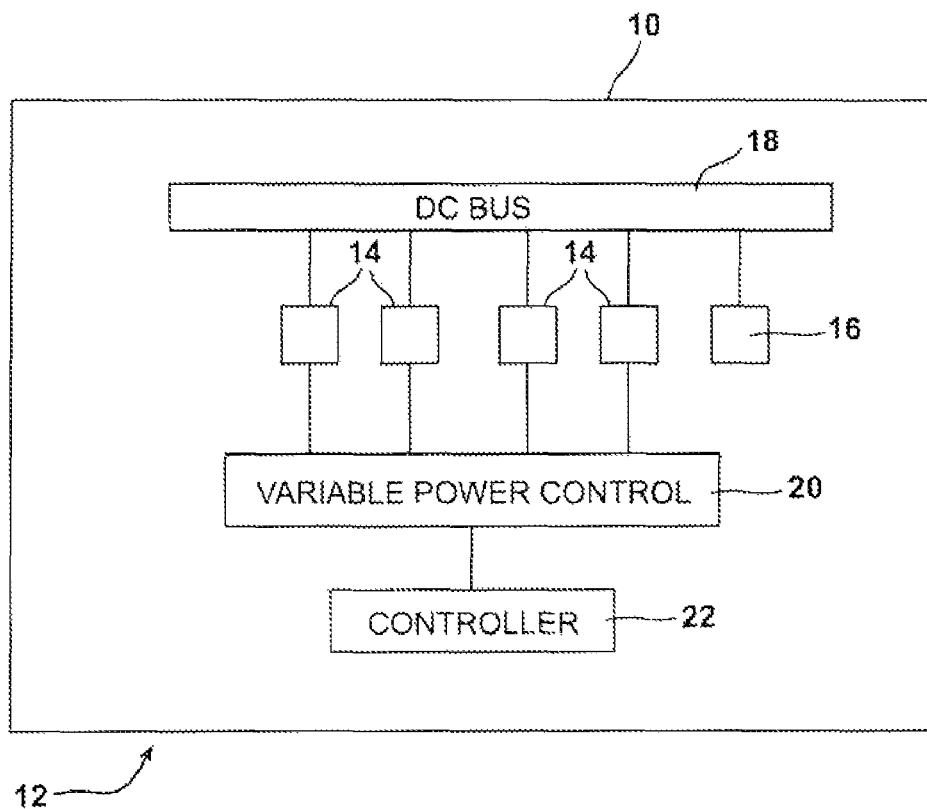
FIG. 8 is a schematical illustration of a vehicle equipped with a propulsion system including a plurality of power sources connected in parallel to a common DC bus.
Figure 9:
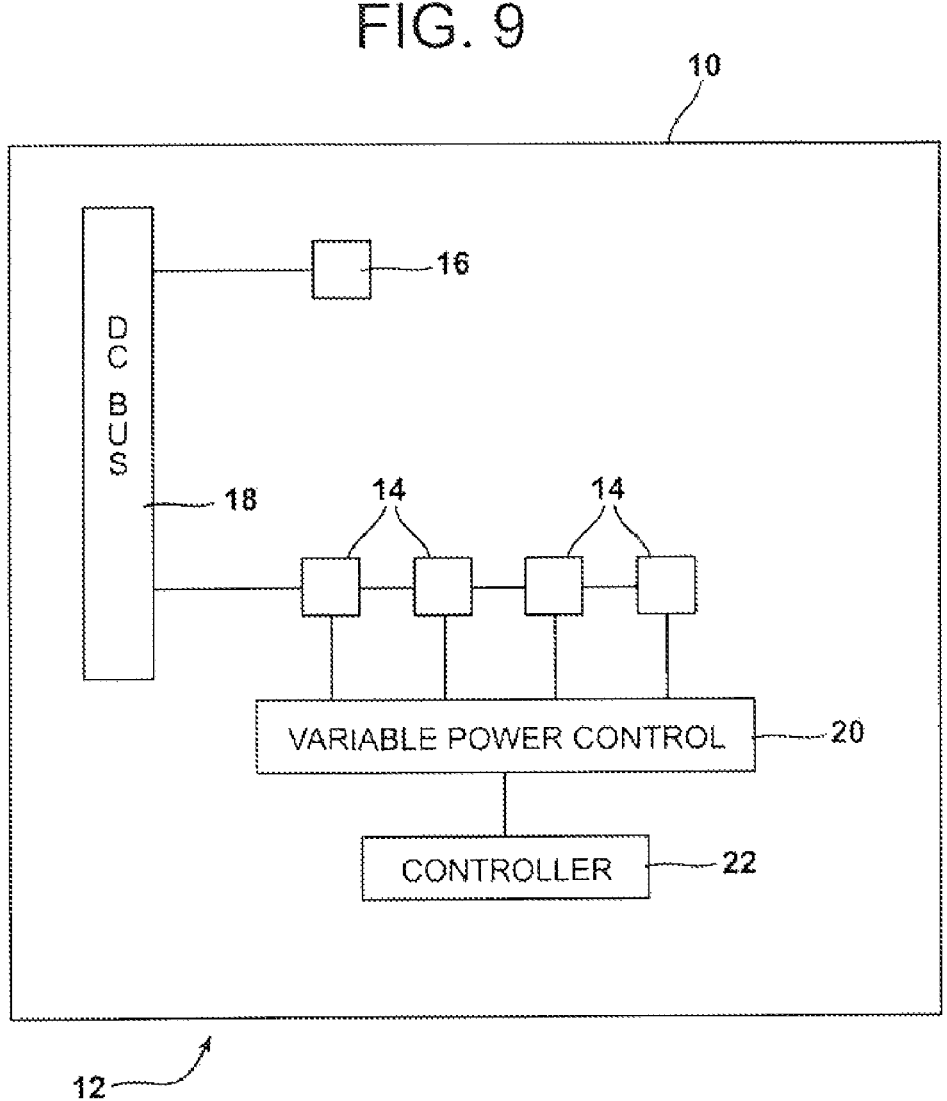
FIG. 9 is a schematical illustration of a vehicle equipped with a propulsion system including a plurality of power sources connected in series to a common DC bus.
Figure 10:
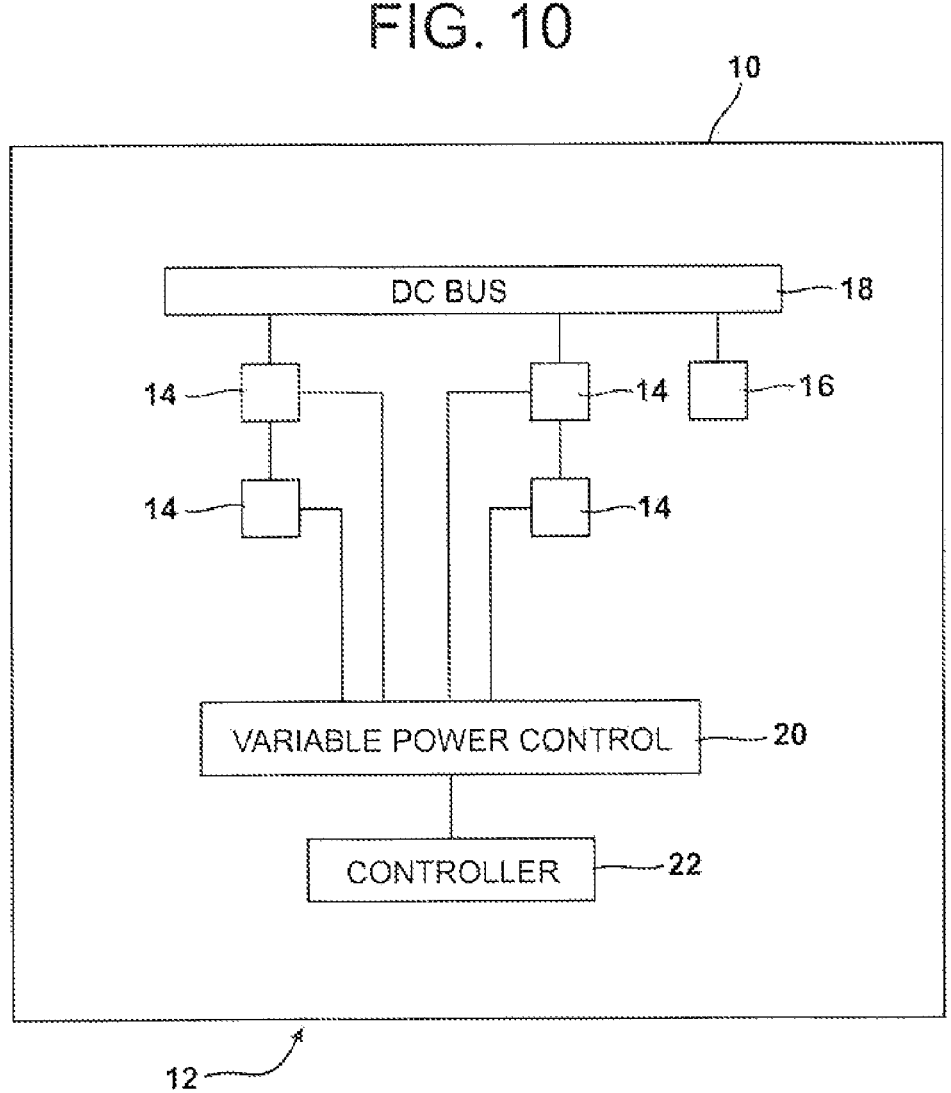
FIG. 10 is a schematical illustration of a vehicle equipped with a propulsion system including a plurality of power sources with some of those power sources connected in parallel and some of those power sources connected in series to a common DC bus.

The same operating strategies can be applied to a hybrid vehicle or locomotive 10 having a propulsion system 12 comprising several power sources or engines 14 and one or more energy storage systems 16 all connected to a common DC bus 18. Each power source/engine 14 is connected to a variable power control 20 which is connected and controlled by a controller 22. In the embodiment illustrated in FIG. 8, the plurality of power sources/engines 14 are connected to the common DC bus 18 in parallel. In the embodiment illustrated in FIG. 9, the plurality of power sources/engines 14 are connected to the common DC bus: 18 in series. In the embodiment illustrated in FIG. 10, the plurality of power sources/engines 14 are connected to the common DC bus 18 both in parallel and in series.

The following examples of control modes are illustrated by a hypothetical locomotive 10 having four identical engines 14 (for example each engine may have a rated power of 600 HP at 1,800 rpms), each engine having a power versus rpm and a torque versus rpm curves such as a shown in FIGS. 1 and 2 and an energy storage unit 16 comprised of a battery pack with a rating of, for example, 1,800 amps maximum at a peak power of 450 kW (600 HP). In this example, the energy storage unit 16 has a maximum power rating of roughly the same as the engines 14.

The battery pack 16 is an instantaneous source of power and therefore can be used to provide power when the notch setting is advanced but before a new engine 14 can be started, or an engine brought up to speed from low-idle. The locomotive 10 can be provided with a control panel 22 that allows the engineer to use only the battery pack 16 if for example, a momentary power surge is required and it would be inefficient to start another engine 14 or bring another engine on-line from idle.

Figure 7:
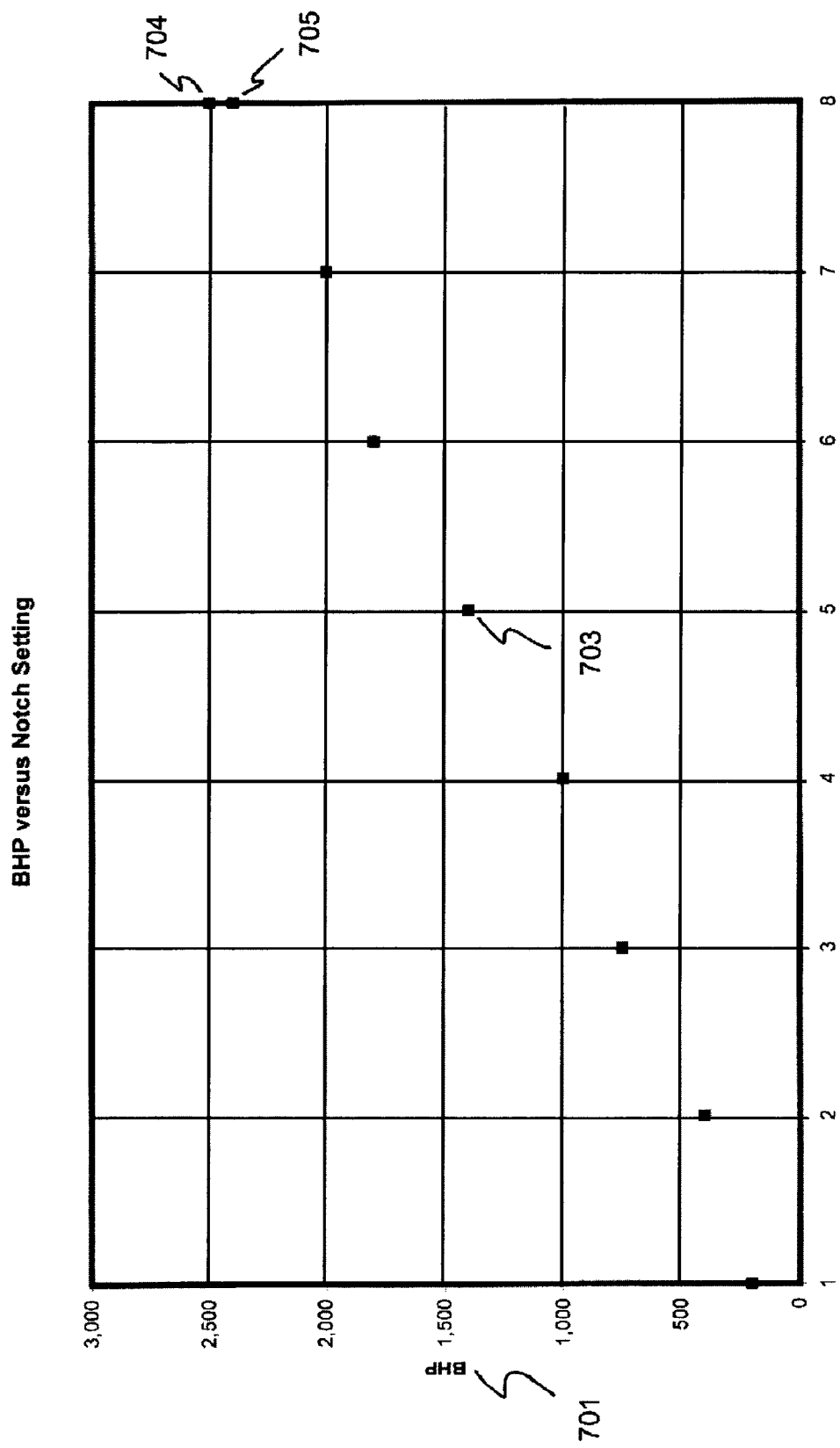
FIG. 7 is a plot of total locomotive engine power versus notch setting for a hybrid multi-engine locomotive configuration.

A possible mode of hybrid operation is shown in Table 8 which is obtained by a prescribed number of engines 14 augmented by an energy storage battery pack 16 for each notch setting. In the top portion of Table 8, the battery 16 is used to power the locomotive 10 when idling and traveling in notch 1. Engines 14 are brought on line for higher notch settings but when the battery 16 can supplement the power required, the battery is used in place of an additional engine. This scenario is an example of a 2,500 HP hybrid locomotive. In the event of sustained operation at any of the higher notches where the energy storage capacity of the battery pack 16 drops below a desired state-of-charge, the locomotive 10 may be operated at on engine power only. In this example, there is some reduction in power developed at the maximum power setting of notch 8. The power versus notch setting for this hybrid locomotive configuration would be approximately as shown in FIG. 7. FIG. 7 shows a plot of total locomotive output power 701 versus the eight power notch settings 702. For either full hybrid operating mode or the low-power hybrid operating mode, the total locomotive power outputs 603 are the same except for notch 8. In this example, the power for the full hybrid mode in notch 8 704 is slightly higher than the power developed for low-power hybrid mode in notch 8 705.

Another operational strategy is to use the battery pack 16 in a power compression role. For example, the four engine locomotive can be operated with three engines 14 and a battery pack 16 where the battery pack is continually charged by the remaining engine 14 set on high-idle. This mode would be effective if the locomotive were standing by for long periods of time but be required to provide a substantial power surge at low to moderate speeds. Where an energy storage system 16 is used in combination with multiple engines 14, at any given power setting while the power and engine speed are set for the engines, the output voltage and output current can be set for the energy storage system to provide the power setting.

A number of variations and modifications of the invention can be used. As will be appreciated, it would be possible to provide for some features of the invention without providing others. For example, in one alternative embodiment, a multi-engine hybrid locomotive may be operated in low- and high-idle and all 8 notch settings on battery power alone until the state-of-charge of the battery pack 16 falls below a selected level. At this point, one of more engines 14 may be selected to provide locomotive propulsive power while a remaining engine may be used to recharge the battery pack.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

TABLE 1

SINGLE ENGINE

| Notch Setting | Engine RPMs | Total BHP |
|---|---|---|
| Low Idle | 600 | 13 |
| High Idle | 750 | 19 |
| 1 | 750 | 32 |
| 2 | 800 | 71 |
| 3 | 916 | 148 |
| 4 | 1,078 | 173 |
| 5 | 1,271 | 268 |
| 6 | 1,566 | 383 |
| 7 | 1,634 | 519 |
| 8 | 1,800 | 630 |

TABLE 2

ENGINE SELECTION FIXED FOR EACH NOTCH SETTING

| Notch Setting | Number of Engines | Engine RPMs | Total BHP |
|---|---|---|---|
| Low Idle | 1 | 600 | 13 |
| High Idle | 1 | 750 | 19 |
| 1 | 1 | 1,000 | 150 |
| 2 | 1 | 1,500 | 450 |
| 3 | 2 | 1,600 | 900 |
| 4 | 2 | 1,650 | 1,080 |
| 5 | 3 | 1,650 | 1,620 |
| 6 | 4 | 1,700 | 2,280 |
| 7 | 5 | 1,800 | 3,150 |
| 8 | 6 | 1,800 | 3,780 |

TABLE 3

LAST ENGINE ON ALLOWED TO VARY

| Notch Setting | Number of Engines | Engine RPMs | RPM Last Engine On | Total BHP |
|---|---|---|---|---|
| Low Idle | 1 | 600 | | 13 |
| High Idle | 1 | 750 | | 19 |
| 1 | 1 | 1,100 | | 210 |
| 2 | 1 | 1,450 | | 420 |
| 3 | 2 | 1,800 | 1,000 | 780 |
| 4 | 2 | 1,800 | 1,450 | 1,050 |
| 5 | 3 | 1,800 | 1,550 | 1,620 |
| 6 | 4 | 1,800 | 1,350 | 2,370 |
| 7 | 5 | 1,800 | 1,450 | 3,120 |
| 8 | 6 | 1,800 | 1,800 | 3,780 |

TABLE 4

ENGINE ADDED WHEN A SELECTED % OF POWER OF OTHER ENGINES EXCEEDED

| Notch Setting | Number of Engines | Engine RPMs | Total BHP |
|---|---|---|---|
| Low Idle | 1 | 600 | 13 |
| High Idle | 1 | 750 | 19 |
| 1 | 1 | 1,071 | 193 |
| 2 | 1 | 1,458 | 425 |
| 3 | 3 | 1,244 | 889 |
| 4 | 3 | 1,326 | 1,038 |
| 5 | 4 | 1,421 | 1,611 |
| 6 | 6 | 1,388 | 2,297 |
| 7 | 6 | 1,615 | 3,113 |
| 8 | 6 | 1,800 | 3,780 |

TABLE 5

NUMBER OF ENGINES FIXED BY ENGINEER AND NOT ALLOWED TO CHANGE

| Notch Setting | Number of Engines | Engine RPMs | Total BHP |
|---|---|---|---|
| Low Idle | 2 | 600 | 25 |
| High Idle | 2 | 750 | 38 |
| 1 | 2 | 804 | 64 |
| 2 | 2 | 868 | 142 |
| 3 | 2 | 997 | 296 |
| 4 | 2 | 1,038 | 346 |
| 5 | 2 | 1,197 | 537 |
| 6 | 2 | 1,388 | 766 |
| 7 | 2 | 1,615 | 1,038 |
| 8 | 2 | 1,800 | 1,260 |

TABLE 6

MAXIMUM FUEL ECONOMY

| Notch Setting | Number of Engines | Engine RPMs | Total BHP |
|---|---|---|---|
| Low Idle | 1 | 600 | 204 |
| High Idle | 1 | 600 | 204 |
| 1 | 1 | 600 | 204 |
| 2 | 1 | 1,400 | 492 |
| 3 | 2 | 1,400 | 984 |
| 4 | 2 | 1,500 | 1,056 |
| 5 | 3 | 1,550 | 1,638 |
| 6 | 4 | 1,600 | 2,256 |
| 7 | 5 | 1,700 | 3,000 |
| 8 | 6 | 1,750 | 3,708 |

TABLE 7

MINIMUM EMISSIONS

| Notch Setting | Number of Engines | Engine RPMs | Total BHP |
|---|---|---|---|
| Low Idle | 1 | 600 | 204 |
| High Idle | 1 | 600 | 204 |
| 1 | 1 | 600 | 204 |
| 2 | 1 | 1,400 | 492 |
| 3 | 2 | 1,400 | 984 |
| 4 | 2 | 1,550 | 1,092 |
| 5 | 3 | 1,550 | 1,638 |
| 6 | 4 | 1,650 | 2,328 |
| 7 | 5 | 1,900 | 3,150 |
| 8 | 6 | 1,900 | 3,780 |

TABLE 8

HYBRID CONFIGURATION

| Mode | Notch Setting | Number of Engines | Engine RPMS | Battery BHP | Total BHP |
|---|---|---|---|---|---|
| Full hybrid mode | Low Idle | 0 | 0 | 13 | 13 |
| | High Idle | 0 | 0 | 19 | 19 |
| | 1 | 0 | 0 | 200 | 200 |
| | 2 | 1 | 1,400 | 0 | 400 |
| | 3 | 1 | 1,800 | 150 | 750 |
| | 4 | 1 | 1,800 | 400 | 1,000 |
| | 5 | 2 | 1,800 | 200 | 1,400 |
| | 6 | 3 | 1,800 | 0 | 1,800 |
| | 7 | 3 | 1,800 | 200 | 2,000 |
| | 8 | 4 | 1,800 | 100 | 2,500 |
| Low power hybrid mode | Low Idle | 0 | 0 | 13 | 13 |
| | High Idle | 0 | 0 | 19 | 19 |
| | 1 | 0 | 0 | 200 | 200 |
| | 2 | 1 | 1,400 | 0 | 400 |
| | 3 | 2 | 1,400 | 0 | 750 |
| | 4 | 2 | 1,550 | 0 | 1,000 |
| | 5 | 3 | 1,550 | 0 | 1,400 |
| | 6 | 4 | 1,650 | 0 | 1,800 |
| | 7 | 4 | 1,650 | 0 | 2,000 |
| | 8 | 4 | 1,900 | 0 | 2,400 |

What is claimed is:

1. A method of controlling a vehicle comprising a plurality of power sources outputting DC electrical power to a common DC bus, and a variable power control having a plurality of power settings, in order to obtain a desired selection of values of operating parameters, said method comprising: (a) determining for each said power setting a number of power sources to be used and at least one of i) power level, ii) engine speed setting, iii) output voltage, and iv) output current for each of said number of power sources in order to obtain a desired set of values of operating parameters for each said power setting; (b) selecting the power setting desired for the vehicle at each operating time and thereby obtaining the desired selection of values of operating parameters associated with that power setting; and (c) setting at said operating time each of the power sources to the corresponding at least one of i) power level, ii) engine speed setting, iii) output voltage, and iv) output current determined under step a) for said selected power setting.

2. The method of claim 1, wherein said operating parameters are selected from the group consisting of (i) fuel efficiency; (ii) low emissions; (iii) a combination of fuel efficiency and low emissions; (iv) power; (v) tractive effort; and (vi) engine lifetime.

3. The method of claim 2, wherein said number of power sources to be used and the power and engine speed setting for each power source in order to obtain the desired fuel efficiency for that power setting are determined using a controller programmed to use fuel consumption maps for each power source.

4. The method of claim 2, wherein said number of power sources to be used and the power and engine speed setting for each power source in order to obtain the desired emissions for that power setting are determined using a controller programmed to use an emissions map for each power source.

5. The method of claim 4, wherein said emissions are selected from the group consisting of hydrocarbons, carbon monoxide, nitrous oxides and particulate material.

6. The method of claim 1, wherein additional power sources are added at higher power settings and a last power source selected is operated at a different power level and engine speed than a previously engaged power source.

7. The method of claim 1, wherein each power setting corresponds to a power level which is obtained by adding another power source as soon as currently operating power sources reach a selected percentage of rated power.

8. The method of claim 2, wherein for each power setting a selected number of power sources are operated in a most fuel efficient mode.

9. The method of claim 8, wherein the power and engine speed setting for each selected power source in order to obtain the desired fuel efficiency for that power setting are determined using a controller programmed to use a fuel consumption map for each selected power source.

10. The method of claim 1, wherein for each power setting a selected number of power sources are operated in a lowest emissions mode.

11. The method of claim 10, wherein said emissions are selected from the group consisting of hydrocarbons, carbon monoxide, nitrous oxides and particulate material.

12. The method of claim 10, wherein the power and engine speed setting for each selected power source in order to obtain the desired emissions for that power setting is determined using a controller programmed to use an emissions map for each selected power source.

13. The method of claim 12, wherein said emissions are selected from the group consisting of hydrocarbons, carbon monoxide, nitrous oxides and particulate material.

14. The method of claim 1, wherein a power source is kept in low- or high-idle for a selected period of time after it has been deselected.

15. The method of claim 1, wherein the selection of particular power sources is based upon at least one of an operating history of each power source, a random number generator output value, a pseudo-random number generator output value, and a round robin scheduler value.

16. The method of claim 1, wherein the selection or deselection of particular power sources is based upon contingencies which affect a power rating of said power source.

17. The method of claim 1, wherein one unused power source is always idling at high-idle so that when additional power is requested, said unused power source at high-idle can add power quickly.

18. The method of claim 2, wherein said emissions comprise types of emissions selected from the group consisting of substances and energy.

19. The method of claim 1, wherein said plurality of power sources comprise a plurality of engines.

20. The method of claim 19, wherein said plurality of power sources comprise a plurality of engines and one or more energy storage systems.

21. The method of claim 20, wherein power from an energy storage system is added if a momentary power surge is required and to otherwise add power from an engine would be inefficient.

22. The method of claim 20, wherein an energy storage system is used to add or provide all power when the vehicle is idling.

23. The method Of claim 20, wherein, when power is added from said plurality of engines for higher power settings, an energy storage system is used in place of an additional engine when said one or more energy storage system can supplement the power required.

24. The method of claim 20, wherein one of said engines is used to continually charge said energy storage system.

25. The method of claim 19, wherein said plurality of engines comprise a plurality of engine configurations.

26. The method of claim 19, wherein said plurality of engines comprise one or more engines connected in parallel to a common DC bus.

27. The method of claim 19, wherein said plurality of engines comprise one or more engines connected in series to a common DC bus.

28. The method of claim 19, wherein said plurality of engines comprise one or more engines connected in parallel to a common DC bus and one or more engines connected in series to a common DC bus.

29. The method of claim 1, wherein said vehicle is of a type selected from the group consisting of locomotive, truck, tugboat and crane.

30. The method of claim 1, wherein said variable power control having a plurality of power settings comprises one or more idle settings and a plurality of power notch settings.

31. A propulsion system for a vehicle, comprising a plurality of power sources outputting DC electrical power to a common DC bus, and a variable power control having a plurality of power settings and means for selecting the power setting desired for the vehicle at each operating time in order to obtain a desired selection of values of operating parameters, wherein each of said power settings is determined by: (a) determining for each said power setting a number of power sources to be used and at least one of i) power level, ii) engine speed setting, iii) output voltage, and iv) output current for each of said number of power sources in order to obtain a desired set of values of operating parameters for each said power setting.

32. The propulsion system of claim 31, wherein said operating parameters are selected from the group consisting of (i) fuel efficiency; (ii) low emissions; combination of fuel efficiency and low emissions; (iv) power; (v) tractive effort; and (vi) engine lifetime.

33. The propulsion system of claim 31, further comprising a controller programmed to use fuel consumption maps for each power source to determine the number of power sources to be used and the power and engine speed setting for each power source in order to obtain the desired fuel efficiency for that power setting.

34. The propulsion system of claim 31, further comprising a controller programmed to use emission maps for each power source to determine the number of power sources to be used and the power and engine speed setting for each power source in order to obtain the desired emissions for that power setting.

35. The propulsion system of claim 31, wherein said plurality of power sources comprise a plurality of engines.

36. The propulsion system of claim 31, wherein said plurality of power sources comprise a plurality of engines and one or more energy storage systems.

37. The propulsion system of claim 35, wherein said plurality of engines comprise a plurality of engine configurations.

38. The propulsion system of claim 35, wherein said plurality of engines comprise one or more engines connected in parallel to a common DC bus.

39. The propulsion system of claim 35, wherein said plurality of engines comprise one or more engines connected in series to a common DC bus.

40. The propulsion system of claim 35, wherein said plurality of engines comprise one or more engines connected in parallel to a common DC bus and one or more engines connected in series to a common DC bus.

41. The propulsion system of claim 31, wherein said vehicle is of a type selected from the group consisting of locomotive, truck, tugboat and crane.

42. The propulsion system of claim 31, wherein said variable power control having a plurality of power settings comprises one or more idle settings and a plurality of power notch settings.

* * * * *